(12) United States Patent
Goto

(10) Patent No.: US 12,559,109 B2
(45) Date of Patent: Feb. 24, 2026

(54) ESTIMATION DEVICE, ESTIMATION METHOD, AND PROGRAM

(71) Applicant: HONDA MOTOR CO., LTD., Tokyo (JP)

(72) Inventor: Takeru Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 18/368,027

(22) Filed: Sep. 14, 2023

(65) Prior Publication Data

US 2024/0092365 A1    Mar. 21, 2024

(30) Foreign Application Priority Data

Sep. 21, 2022    (JP) ................................. 2022-150240

(51) Int. Cl.
B60W 40/04        (2006.01)
G06V 20/58        (2022.01)
G08G 1/16         (2006.01)

(52) U.S. Cl.
CPC ............. B60W 40/04 (2013.01); G08G 1/167 (2013.01); B60W 2552/10 (2020.02);
(Continued)

(58) Field of Classification Search
CPC ............. B60W 40/04; B60W 2552/10; B60W 2554/4041; B60W 2554/4045;
(Continued)

(56) References Cited

U.S. PATENT DOCUMENTS

| | | | |
|---|---|---|---|
| 8,238,606 B2 * | 8/2012 | Sasaki | G06V 20/58 |
| | | | 382/250 |
| 2013/0054106 A1 * | 2/2013 | Schmudderich | G01S 13/931 |
| | | | 701/1 |

(Continued)

FOREIGN PATENT DOCUMENTS

| | | |
|---|---|---|
| JP | 2017/002441 | 9/2017 |
| JP | 2019-031268 | 2/2019 |

(Continued)

OTHER PUBLICATIONS

Japanese Office Action for Japanese Patent Application No. 2022-150240 mailed Aug. 26, 2025.

*Primary Examiner* — Ashley L Redhead, Jr.
(74) *Attorney, Agent, or Firm* — Amin, Turocy & Watson, LLP

(57)    ABSTRACT

Provided is an estimation device configured to: acquire prediction parameters, which are distribution information on second parameters, by inputting actual parameters, which are first parameters, into: a first trained model, which is trained to output distribution information on second parameters in response to input of first parameters by using training data and correct data; and a second trained model, which is trained to output distribution information on second parameters in response to input of first parameters by using training data and correct data; and estimate whether or not the second mobile object is to take the predetermined action by comparing the prediction parameters with the actual parameters at a subject time of the prediction parameters.

9 Claims, 5 Drawing Sheets

(52) U.S. Cl.
CPC .............. *B60W 2554/4041* (2020.02); *B60W 2554/4045* (2020.02); *B60W 2554/802* (2020.02); *B60W 2554/804* (2020.02); *G06V 20/58* (2022.01)

(58) Field of Classification Search
CPC ...... B60W 2554/802; B60W 2554/804; G08G 1/167; G06V 20/58
See application file for complete search history.

(56) References Cited

U.S. PATENT DOCUMENTS

| | | | | |
|---|---|---|---|---|
| 2017/0022015 | A1* | 1/2017 | Göllü | G06K 7/1413 |
| 2017/0185956 | A1* | 6/2017 | Göllü | B65G 43/00 |
| 2018/0182245 | A1 | 6/2018 | Takabayashi et al. | |
| 2019/0378405 | A1* | 12/2019 | Lee | G06N 20/00 |
| 2020/0086882 | A1* | 3/2020 | Kodali | B60W 40/09 |
| 2020/0276972 | A1 | 9/2020 | Ito | |
| 2022/0066460 | A1* | 3/2022 | Ivanovic | G06N 3/044 |
| 2022/0324484 | A1* | 10/2022 | Hruschka | B60W 30/0956 |
| 2023/0053459 | A1 | 2/2023 | You | |

FOREIGN PATENT DOCUMENTS

| | | |
|---|---|---|
| JP | 2018/163349 | 6/2019 |
| JP | 2019-094044 | 6/2019 |
| WO | 2022/052856 | 3/2022 |

* cited by examiner

FIG. 3

|  | TRAINING DATA | | | | | CORRECT DATA |
|---|---|---|---|---|---|---|
| t=5 | $S_0$ | $S_1$ | $S_2$ | $S_3$ | $S_4$ | $S_5$ |
| t=6 | $S_1$ | $S_2$ | $S_3$ | $S_4$ | $S_5$ | $S_6$ |
| ... | | | | | | |
| t=end | $S_{end-5}$ | $S_{end-4}$ | $S_{end-3}$ | $S_{end-2}$ | $S_{end-1}$ | $S_{end}$ |

FIG. 4

<FIRST TRAINED MODEL 152>

INPUT

RELATIVE POSITION AND RELATIVE SPEED OF ANOTHER VEHICLE AND SPEED OF HOST VEHICLE IN CURRENT STEP

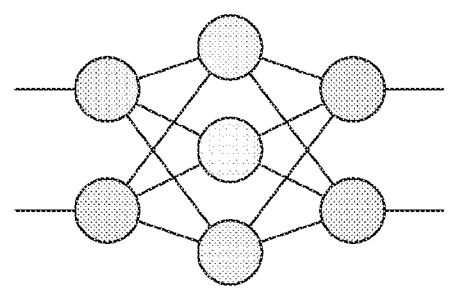

OUTPUT

PREDICTION DISTRIBUTION REPRESENTING RELATIVE POSITION AND RELATIVE SPEED OF ANOTHER VEHICLE IN NEXT STEP (ASSUMING ANOTHER VEHICLE WERE TO YIELD TO HOST VEHICLE)

<SECOND TRAINED MODEL 154>

RELATIVE POSITION AND RELATIVE SPEED OF ANOTHER VEHICLE AND SPEED OF HOST VEHICLE IN CURRENT STEP

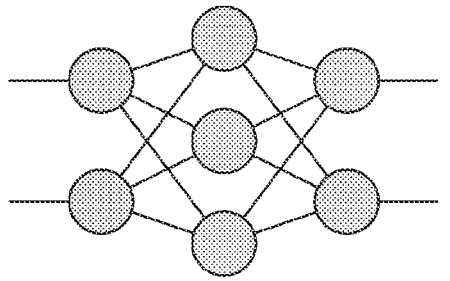

PREDICTION DISTRIBUTION REPRESENTING RELATIVE POSITION AND RELATIVE SPEED OF ANOTHER VEHICLE IN NEXT STEP (ASSUMING ANOTHER VEHICLE WERE NOT TO YIELD TO HOST VEHICLE)

ESTIMATION DEVICE, ESTIMATION METHOD, AND PROGRAM

CROSS-REFERENCE TO RELATED APPLICATION

The application is based on Japanese Patent Application No. 2022-150240 filed on Sep. 21, 2022, the content of which is incorporated herein by reference.

BACKGROUND

Field of the Invention

The present invention relates to an estimation device, an estimation method, and a program.

Description of Related Art

Hitherto, a technology for controlling traveling of a mobile object when the mobile object changes lanes from a travel lane to an adjacent lane is known. For example, Japanese Patent Application Publication No. 2019-31268, describes a technology for merging a vehicle between a second vehicle and a third vehicle according to a control policy learned from passively collected data related to vehicle operations.

The technology disclosed in Japanese Patent Application Publication No. 2019-31268 learns the control policy by applying a passive actor-critic reinforcement learning method to the passively collected data related to vehicle operations. However, the related art does not effectively utilize data of the second mobile object at the time of merging by the mobile object in some cases. As a result, behavior of the second mobile object at the time of merging by the mobile object cannot be estimated accurately in some cases.

SUMMARY

The present invention has been made in view of the above-mentioned circumstances, and has an object to provide an estimation device, an estimation method, and a program that are capable of accurately estimating behavior of a second mobile object at the time of merging by a mobile object by effectively utilizing data of the second mobile object.

An estimation device, an estimation method, and a program according to the present invention adopt the following configuration.

(1): According to one aspect of the present invention, there is provided an estimation device for estimating an action of a second mobile object for a mobile object, including a storage medium storing computer-readable commands, and a processor connected to the storage medium, the processor being configured to execute the computer-readable commands to: acquire prediction parameters, which are distribution information on second parameters, by inputting actual parameters, which are first parameters, into: a first trained model, which is trained to output distribution information on second parameters in response to input of first parameters by using training data and correct data, the training data including time-series first parameters representing a relationship between the mobile object and the second mobile object in a first scene in which the second mobile object has taken a predetermined action, the correct data including second parameters representing states of the second mobile object in the first scene; and a second trained model, which is trained to output distribution information on second parameters in response to input of first parameters by using training data and correct data, the training data including the time-series first parameters in a second scene in which the second mobile object has not taken the predetermined action, the correct data including the second parameters in the second scene; and estimate whether or not the second mobile object is to take the predetermined action by comparing the prediction parameters with the actual parameters at a subject time of the prediction parameters.

(2): In the aspect (1), the first parameters include at least a relative speed of the second mobile object with respect to the mobile object, a relative position of the second mobile object with respect to the mobile object, and a speed of the mobile object.

(3): In the aspect (1), the distribution information on second parameters output from the first trained model is first distribution information on a relative speed and relative position of the second mobile object with respect to the mobile object predicted if the second mobile object has taken the predetermined action, and the distribution information on second parameters output from the second trained model is second distribution information on a relative speed and relative position of the second mobile object with respect to the mobile object predicted if the second mobile object has not taken the predetermined action.

(4) In the aspect (3), the processor performs repeated estimation of whether or not the second mobile object is to take the predetermined action by a probability value, and the processor uses the probability value at a previous time of estimation, the first distribution information at a current time of estimation, and the second distribution information at the current time of estimation to estimate the probability value at the current time.

(5) In the aspect (4), the processor estimates the probability value at an initial time of the repeated estimation by using a third trained model that is trained to output whether or not the second mobile object is to take the predetermined action as a probability value in response to input of a parameter representing a relationship between the mobile object and the second mobile object.

In the aspect (4), the processor assists in driving of the mobile object based on the probability value.

(7): In the aspect (1), the predetermined action is an action indicating that when the mobile object changes lanes from a travel lane to an adjacent lane, the second mobile object traveling on the adjacent lane allows the mobile object to cut into the adjacent lane.

(8): According to another aspect of the present invention, there is provided an estimation method for estimating an action of a second mobile object for a mobile object, which is to be executed by a computer, the estimation method including: acquiring prediction parameters, which are distribution information on second parameters, by inputting actual parameters, which are first parameters, into: a first trained model, which is trained to output distribution information on second parameters in response to input of first parameters by using training data and correct data, the training data including time-series first parameters representing a relationship between the mobile object and the second mobile object in a first scene in which the second mobile object has taken a predetermined action, the correct data including second parameters representing states of the second mobile object in the first scene; and a second trained model, which is trained to output distribution information on second parameters in response to input of first parameters by using training data and correct data, the training data including the time-series first parameters in a second scene in which the second mobile object has not taken the predetermined action, the correct data including the second parameters in the second scene; and estimating whether or not the second mobile object is to take the predetermined action by comparing the prediction parameters with the actual parameters at a subject time of the prediction parameters.

(9): According to another aspect of the present invention, there is provided a program for estimating an action of a second mobile object for a mobile object, which is to be executed by a computer, the program causing the computer to: acquire prediction parameters, which are distribution information on second parameters, by inputting actual parameters, which are first parameters, into: a first trained model, which is trained to output distribution information on second parameters in response to input of first parameters by using training data and correct data, the training data including time-series first parameters representing a relationship between the mobile object and the second mobile object in a first scene in which the second mobile object has taken a predetermined action, the correct data including second parameters representing states of the second mobile object in the first scene; and a second trained model, which is trained to output distribution information on second parameters in response to input of first parameters by using training data and correct data, the training data including the time-series first parameters in a second scene in which the second mobile object has not taken the predetermined action, the correct data including the second parameters in the second scene; and estimate whether or not the second mobile object is to take the predetermined action by comparing the prediction parameters with the actual parameters at a subject time of the prediction parameters.

According to the aspects (1) to (9), it is possible to accurately estimate behavior of a second mobile object at the time of merging by a mobile object by effectively utilizing data of the second mobile object.

BRIEF DESCRIPTION OF THE DRAWINGS

FIG. 3 is a diagram illustrating exemplary configurations of training data and correct data to be used for generating the first trained model and the second trained model.

FIG. 4 is a diagram illustrating an exemplary configuration of input/output of the first trained model and the second trained model generated through training.

FIG. 5 is a diagram illustrating an example of distribution information on prediction parameters acquired by the parameter acquirer.

DESCRIPTION OF EMBODIMENTS

In the following, description is given of an estimation device, an estimation method, and a program according to an embodiment of the present invention with reference to the drawings. The estimation device according to this embodiment estimates whether or not another vehicle is to take a predetermined action by comparing actual parameters of the vehicle with the predicted distributions of states of the vehicle output from a first trained model and a second trained model, the first trained model being generated based on training data collected when the vehicle has taken a predetermined action, the second trained model being generated based on training data collected when the vehicle has not taken a predetermined action. In the following description, as an example, an estimation device according to this embodiment is applied to estimate, as the predetermined action, whether or not another vehicle traveling on a merged lane allows a vehicle traveling on a merging lane to cut in the merged lane.

[Overall Configuration]

Figure 1:
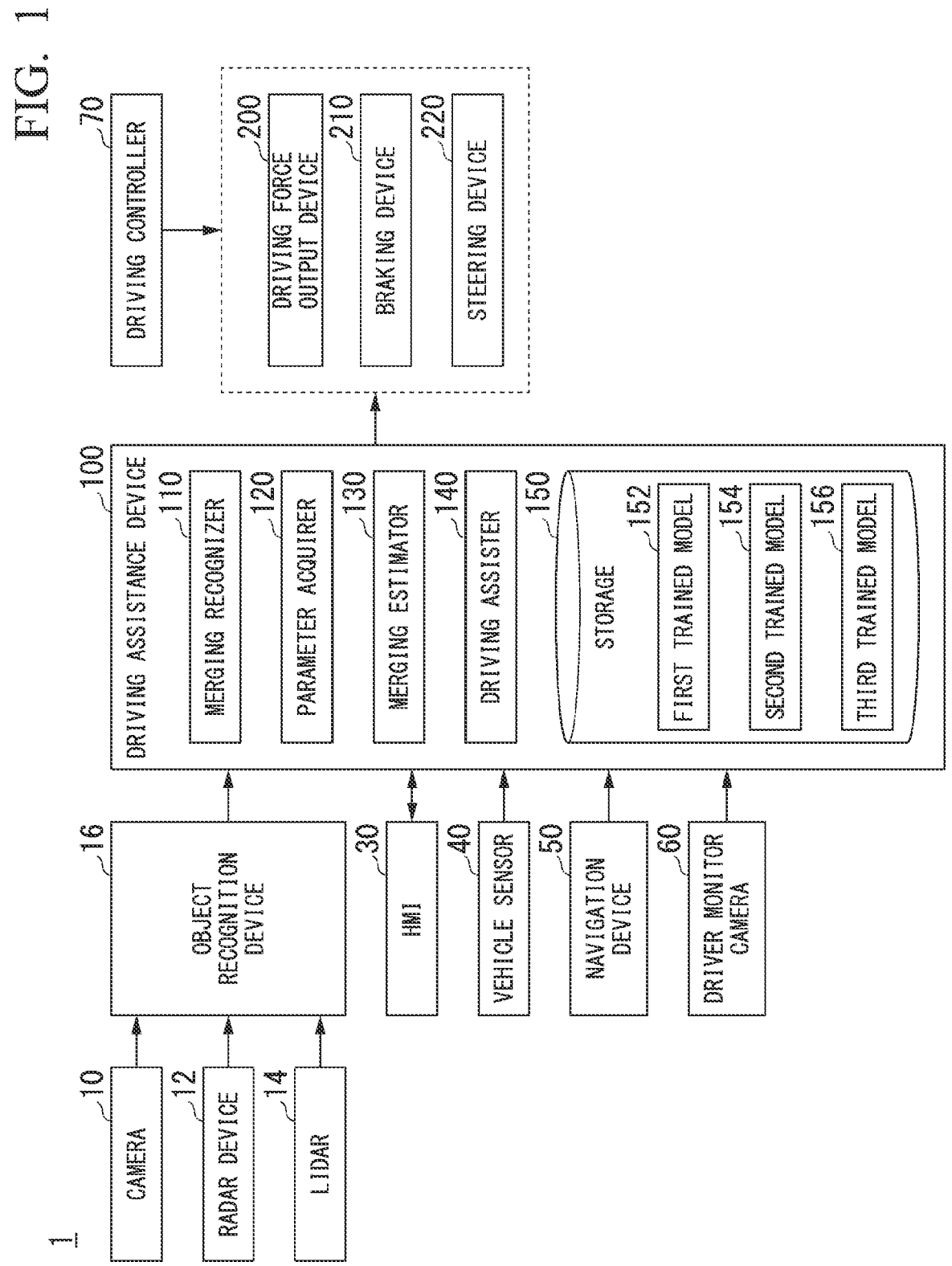
FIG. 1 is a configuration diagram of a vehicle in which a driving assistance device according to an embodiment is mounted.

FIG. 1 is a configuration diagram of a vehicle M in which a driving assistance device 100 according to an embodiment is mounted. The vehicle M is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell. The vehicle M is an example of "mobile object".

The vehicle M includes, for example, a camera 10, a radar device 12, a LIDAR (Light Detection and Ranging) device 14, an object recognition device 16, an HMI (Human Machine Interface) 30, a vehicle sensor 40, a navigation device 50, a driver monitoring camera 60, a driving controller 70, a driving assistance device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "host vehicle M") including a vehicle system 1. When the camera 10 picks up a front image, the camera 10 is mounted on, for example, an upper part of a front windshield or a back surface of a rear-view mirror. The camera 10 repeatedly photographs the surroundings of the host vehicle M periodically, for example. The camera 10 may be a stereo camera.

The radar device 12 radiates a radio wave such as a millimeter wave toward the surroundings of the host vehicle M, and detects a radio wave (reflected wave) reflected by an object, to detect at least the position (distance and direction) of the object. The radar device 12 is mounted on any part of the host vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the host vehicle M, and measures diffused light. The LIDAR 14 detects a distance to a target based on a period of time since emission of light until reception of light. The light to be radiated is, for example, pulsed laser light. The LIDAR 14 is mounted on any part of the host vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the driving assistance device 100. The object recognition device 16 may output the results of detection by the camera 10, the radar device 12, and the LIDAR 14 to the driving assistance device 100 as they are. The object recognition device 16 may be omitted from the vehicle system 1.

The HMI 30 presents various kinds of information to an occupant of the host vehicle M, and receives input of an operation by the occupant. The HMI 30 includes, for example, various kinds of display devices, speakers, buzzers, vibrators, touch panels, switches, and keys.

The vehicle sensor 40 includes, for example, a vehicle speed sensor that detects a speed of the host vehicle M, an acceleration sensor that detects an acceleration, a yaw rate sensor that detects an angular speed with respect to a vertical axis, and an orientation sensor that detects an orientation of the host vehicle M.

The navigation device 50 includes, for example, a GNSS (Global Navigation Satellite System) receiver, a guidance controller, and a storage storing map information. The GNSS receiver identifies the position of the host vehicle M based on a signal received from a GNSS satellite. The position of the host vehicle M may be identified or complemented by an INS (Inertial Navigation System) that uses output of the vehicle sensor 40. The guidance controller refers to the map information to determine a route from the position (or any input position) of the host vehicle M identified by the GNSS receiver to a destination input by an occupant, and outputs guidance information to the HMI 30 such that the host vehicle M travels along the route. The map information is, for example, information representing road structure by a link indicating a road and nodes connected by the link. The map information may include, for example, a curvature of a road and POI (Point Of Interest) information. The navigation device 50 may transmit the current position and the destination to a navigation server via a communication device, and acquire a route from the navigation server.

The driver monitor camera 60 is, for example, a digital camera that uses a solid image pickup device such as a CCD or a CMOS. The driver monitor camera 60 is mounted on any part of the host vehicle M at a position and in a direction so as to be capable of picking up a front image of a head of an occupant sitting on a driver seat of the host vehicle M. The driver monitor camera 60 outputs, to the driving assistance device 100, an image obtained by photographing the vehicle interior including the driver of the host vehicle M from the position of the driver monitor camera 60.

The driving controller 70 includes, for example, an acceleration pedal, a brake pedal, a steering wheel, a gear shift, and other controllers. A sensor that detects an operation amount or whether an operation is applied is mounted on the driving controller 70, and the detection result is output to a part or all of the driving force output device 200, the braking device 210, and the steering device 220.

The driving force output device 200 outputs, to a drive wheel, a traveling driving force (torque) for causing the host vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the driving assistance device 100 or information input from the driving controller 70.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the driving assistance device 100 or information input from the driving controller 70, and causes a brake torque that depends on a braking operation to be output to each wheel. The braking device 210 may include, as a backup, a mechanism for transmitting the hydraulic pressure, which is caused by an operation of the brake pedal included in the driving controller 70, to the cylinder via a master cylinder. The configuration of the braking device 210 is not limited to the configuration described above, and the braking device 210 may be an electronic hydraulic brake device configured to control an actuator in accordance with information input from the driving assistance device 100, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the driving assistance device 100 or information input from the driving controller 70 to change the orientation of the steered wheel.

[Driving Assistance Device]

The driving assistance device 100 includes, for example, a merging recognizer 110, a parameter acquirer 120, a merging estimator 130, a driving assister 140, and a storage 150. The merging recognizer 110, the parameter acquirer 120, the merging estimator 130, and the driving assister 140 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the driving assistance device 100.

The storage 150 is implemented by, for example, a ROM (Read Only Memory), a flash memory, an SD card, a RAM (Random Access Memory), an HDD (Hard Disk Drive), a register, or the like. The storage 150 stores, for example, a first trained model 152, a second trained model 154, and a third trained model 156. A device including at least the parameter acquirer 120, the merging estimator 130, and the first trained model 152 and second trained model 154 stored in the storage 150 is an example of "estimation device". Further, in this embodiment, the first trained model 152, the second trained model 154, and the third trained model 156 are stored in the storage 150 to be used by functional units of the driving assistance device 100. However, alternatively, a part or all of the trained models may be stored in an external cloud server to be used by the driving assistance device 100 via a network.

Figure 2:
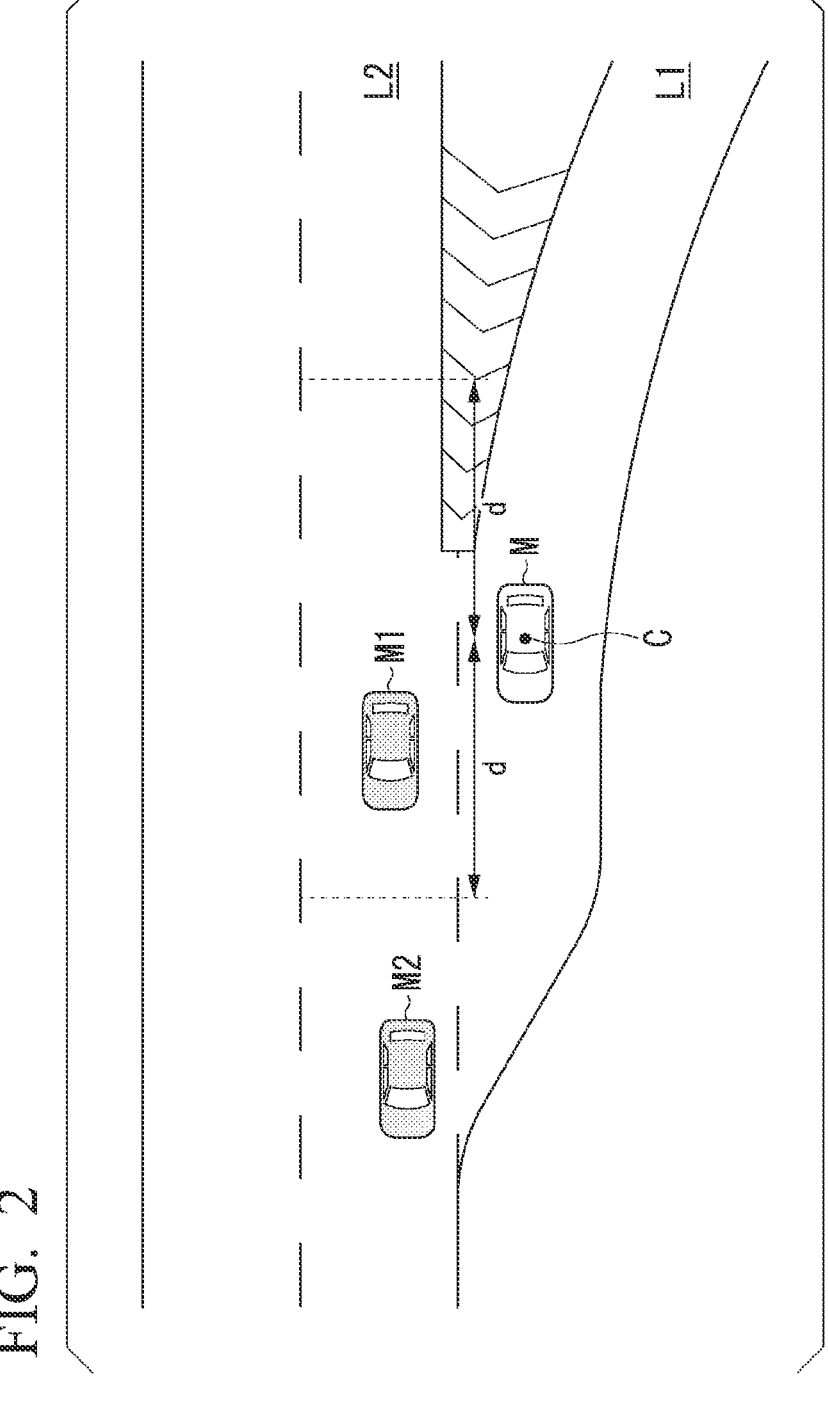
FIG. 2 is a diagram illustrating an example of a merging lane recognized by a merging recognizer.

The merging recognizer 110 recognizes whether or not the travel lane of the host vehicle M is a merging lane necessary for the host vehicle M to change lanes to an adjacent lane. FIG. 2 is a diagram illustrating an example of the merging lane recognized by the merging recognizer 110. FIG. 2 indicates that a travel lane L1 of the host vehicle M is a merging lane necessary for changing lanes to an adjacent lane L2. For example, the merging recognizer 110 can use road lane marking information recognized by the camera 10 to recognize the travel lane of the host vehicle M as a merging lane when the width of the travel lane of the host vehicle M decreases to zero and it is possible to change lanes to an adjacent lane. Further, for example, the merging recognizer 110 can recognize the travel lane of the host vehicle M as a merging lane by using the navigation device 50 to compare the current position of the host vehicle M identified by the GNSS receiver with the map information.

When the merging recognizer 110 recognizes the travel lane of the host vehicle M as a merging lane, the merging recognizer 110 next determines whether or not there is another vehicle (second vehicle) on an adjacent lane (that is, merged lane) to be cut in by the host vehicle M. More specifically, for example, the merging recognizer 110 uses information recognized by the object recognition device 16 to determine whether or not there is another vehicle within a predetermined distance d (that is, within predetermined range) from the center C of gravity of the host vehicle M with respect to the extension direction of the adjacent lane. When it is determined that there is no other vehicle within the predetermined distance d, the driving assister 140 displays, for example, on the HMI 30, recommendation information for recommending that the host vehicle M changes lanes from the travel lane to the adjacent lane. On the other hand, when it is determined that there is another vehicle within the predetermined distance d, the merging recognizer 110 recognizes the vehicle as a target to be subjected to processing by the parameter acquirer 120 and the merging estimator 130 described below. In the case of the scene illustrated in FIG. 2, the merging recognizer 110 recognizes a vehicle M1 as a target to be subjected to processing by the parameter acquirer 120 and the merging estimator 130.

The parameter acquirer 120 acquires, for another vehicle recognized as a target to be subjected to the merging recognizer 110, first parameters representing a relationship between the host vehicle M and another vehicle in time series (in predetermined control cycles). The first parameters include, for example, at least the relative speed of another vehicle with respect to the host vehicle M, the relative position of another vehicle with respect to the host vehicle M, and the speed of the host vehicle M. For example, the parameter acquirer 120 can calculate the relative speed and relative position of another vehicle with respect to the host vehicle M based on images of another vehicle photographed by the camera 10 in time series. Further, for example, the parameter acquirer 120 can acquire the speed of the host vehicle M from the vehicle sensor 40 in time series. In the case of the scene illustrated in FIG. 2, the merging recognizer 110 acquires, for the vehicle M1, the relative speed of the vehicle M1 with respect to the host vehicle M, the relative position of the vehicle M1 with respect to the host vehicle M, and the speed of the host vehicle M. In the following, the relative speed of another vehicle with respect to the host vehicle M and the relative position of another vehicle with respect to the host vehicle M are hereinafter sometimes referred to as "relative speed of another vehicle" and "relative position of another vehicle", respectively.

When the parameter acquirer 120 acquires the first parameters for another vehicle recognized as a target to be subjected to processing by the merging recognizer 110, the parameter acquirer 120 inputs the acquired first parameters into the first trained model 152 and the second trained model 154 to acquire distribution information on second parameters representing the state of another vehicle. The second parameters representing the state of another vehicle represent, for example, the relative speed and relative position of another vehicle in next step of the control cycle. Now, details of the first trained model 152 and the second trained model 154 are described below.

FIG. 3 is a diagram illustrating exemplary configurations of training data and correct data to be used for generating the first trained model 152 and the second trained model 154. In the table illustrated in FIG. 3, the input corresponds to training data, and the output corresponds to correct data. The reference symbol s represents the state of another vehicle. More specifically, the state s of input training data represents the relative speed and relative position of another vehicle and the speed of the host vehicle M, and the state s of output correct data represents the relative speed and relative position of another vehicle. The reference symbol t represents a time point in the control cycle. For example, the record of t=5 in the table illustrated in FIG. 3 indicates that data representing the state $s_5$ of another vehicle at a time point 5 in the control cycle is associated with data representing states $s_0$ to $s_4$ of another vehicle from time points 0 to 4 in the control cycle.

Based on the data configuration described above, the training data and correct data used to generate the first trained model 152 are data collected when another vehicle traveling on the adjacent lane intentionally performed an action (i.e., yielding action) indicating permission for the host vehicle M to proceed when the host vehicle M changes lanes from the travel lane to the adjacent lane. For example, in the scene illustrated in FIG. 2, the subject person driving the vehicle M1 intentionally performs a yielding action in response to the host vehicle M approaching the adjacent lane, and the state data of another vehicle acquired when the vehicle M1 intentionally performed the yielding action is stored as the training data and correct data. Here, the phrase "intentional yielding action" refers to, for example, the subject person intentionally decelerating the vehicle M1 in response to the host vehicle M approaching the adjacent lane, and creating a space between the vehicle M1 and a preceding vehicle M2. The yielding action is an example of a "predetermined action".

The training data and correct data used to generate the second trained model 154, on the other hand, are data collected when another vehicle traveling on the adjacent lane intentionally performed a non-yielding action (i.e., not allowing the host vehicle M to proceed) when the host vehicle M changes lanes from the travel lane to the adjacent lane. For example, in the scene illustrated in FIG. 2, the subject person driving the vehicle M1 intentionally performs a non-yielding action in response to the host vehicle M approaching the adjacent lane, and the state data of another vehicle acquired when the vehicle M1 intentionally performed the non-yielding action is stored as the training data and correct data. Here, the phrase "intentional non-yielding action" refers to, for example, the subject intentionally accelerating (or without decelerating) the vehicle M1 in response to the host vehicle M approaching the adjacent lane, and eliminating a space between the vehicle M1 and the preceding vehicle M2.

In this manner, the first trained model 152 is generated based on the training data and correct data storing state data of another vehicle acquired when the subject person intentionally performed a yielding action, whereas the second trained model 154 is generated based on the training data and correct data storing state data of another vehicle acquired when the subject person intentionally performed a non-yielding action. Using these training data and correct data, training is performed using techniques such as LSTM (Long Short Term Memory), which is a type of Recurrent Neural Network (RNN) that considers time series, to thereby generate the first trained model 152 and the second trained model 154.

FIG. 4 is a diagram illustrating an exemplary configuration of input/output of the first trained model 152 and the second trained model 154 generated through training. As illustrated in FIG. 4, the first trained model 152 and the second trained model 154 are designed to output predictive distributions relating to the relative speed and relative position of another vehicle in the next step of the control cycle in response to input of the speed of the host vehicle M and the relative speed and relative position of another vehicle in the current step of the control cycle. More specifically, in this embodiment, it is assumed that the relative speed and relative position of another vehicle in the next step follow a normal distribution, and the first trained model 152 and the second trained model 154 are trained to output the expected value and variance of a normal distribution representing the relative speed and relative position of another vehicle in the next step.

In other words, the first trained model 152 provides distribution information representing the relative speed and relative position that another vehicle would have in the next step if another vehicle were to yield to the host vehicle M. On the other hand, the first trained model 154 provides distribution information representing the relative speed and relative position that another vehicle would have in the next step if another vehicle were not to yield to the host vehicle M. The relative speed and relative position of another vehicle and the speed of the host vehicle M in the current step of the control cycle, which are to be input to the first trained model 152 and the second trained model 154, are examples of "actual parameters", and the expected value and variance of the normal distribution representing the relative speed and relative position of another vehicle in the next step, which are output from the first trained model 152 and the second trained model 154, are examples of "prediction parameters".

Figure 5:
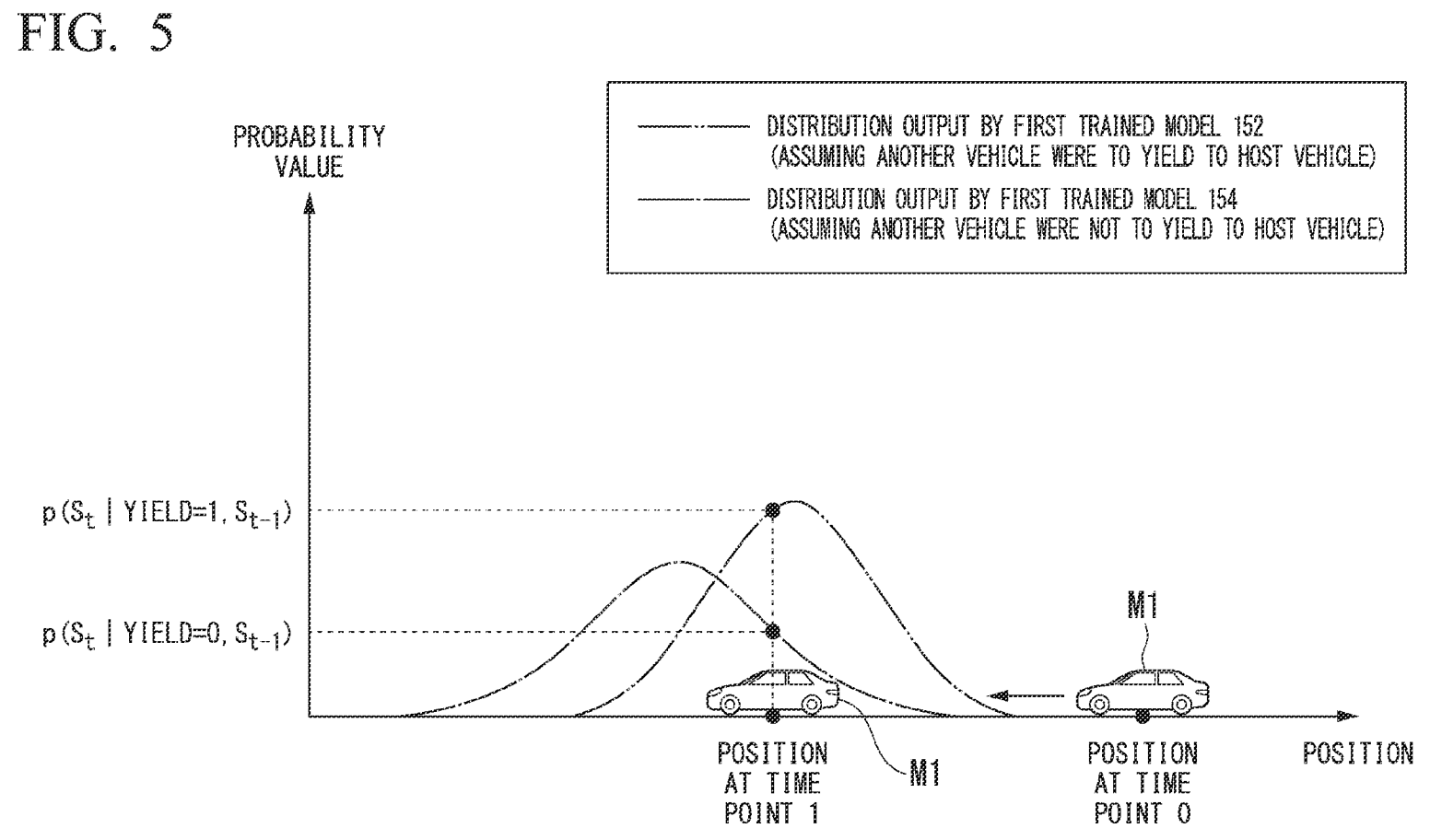

FIG. 5 is a diagram illustrating an example of distribution information on prediction parameters acquired by the parameter acquirer 120. FIG. 5 represents an example in which the first trained model 152 and the second trained model 154 output, as normal distributions, distribution information on the relative position among the prediction parameters. The expected value of the output normal distribution represents an expected value of the movement destination of another vehicle, and the variance represents an individual error and sensor error (that is, including error of camera 10 and error of vehicle sensor 40) relating to movement of another vehicle. The merging estimator 130 compares the prediction parameters acquired by the parameter acquirer 120 with the actual parameters (that is, actual parameters measured in next step) measured at a subject time of the prediction parameters to estimate whether or not another vehicle is to yield to the host vehicle M (take the predetermined action). Now, description is given in detail of estimation processing to be executed by the merging estimator 130.

First, the merging estimator 130 uses the third trained model 156 to estimate a probability (that is, initial probability) at an initial time point relating to whether or not another vehicle, which is recognized by the merging recognizer 110 as a processing target, is to yield to the host vehicle M. The third trained model 156 is a trained model that is trained to receive input of first parameters representing a relationship between the host vehicle M and another vehicle to output, as a probability value, whether or not another vehicle is to yield to the host vehicle M. Training data to be used for generating the third trained model 156 is data of first parameters at a predetermined time point (that is, non-time series data), and correct data is information (for example, 1 if another vehicle yielded to the host vehicle M or 0 if another vehicle did not yield to the host vehicle M) indicating whether or not another vehicle yielded to the host vehicle M under the state of first parameters at the predetermined time point. Contrary to the first trained model 152 and the second trained model 154, the training data and correct data used for generating the third trained model 156 are collected by a subject person driving another vehicle to yield to or not to yield to the host vehicle M based on his or her own decision. In the following, $P(yield=1|s_0)$ represents an initial probability of another vehicle yielding to the host vehicle M, which is output from the third trained model 156 in response to input of a first parameter $s_0$ at an initial time point 0, and $P(yield=0|s_0)$ represents an initial probability of another vehicle not yielding to the host vehicle M, which is output from the third trained model 156 in response to input of the first parameter $s_0$ at the initial time point 0.

At this time, when the initial probability output from the third trained model 156 is equal to or larger than a threshold value (for example, 0.8), the merging estimator 130 may not execute the processing using the first trained model 152 and the second trained model 154, and the driving assister 140 may display, on the HMI 30, for example, recommendation information for recommending that the host vehicle M changes lanes from the travel lane to the adjacent lane. Further, for example, when the initial probability output from the third trained model 156 is equal to or smaller than another threshold value (for example, 0.2), the merging estimator 130 may not execute the processing using the first trained model 152 and the second trained model 154, and the driving assister 140 may display, on the HMI 30, for example, recommendation information for recommending that the host vehicle M does not change lanes from the travel lane to the adjacent lane.

After the merging estimator 130 calculates the initial probability for another vehicle, the merging estimator 130 uses Bayesian estimation to update the probability of another vehicle yielding to the host vehicle M in time series (that is, for time points k (k=1, 2, . . . ). More specifically, the merging estimator 130 inputs the first parameter $s_0$ at the first time point 0 into the first trained model 152 and the second trained model 154 to acquire a prediction distributions $p(s_1|yield=1, s_0)$ and $p(s_1|yield=0, s_0)$ at a time point 1. The merging estimator 130 next substitutes actual parameters (that is, relative position and relative speed of another vehicle) measured at the time point 1 into the acquired prediction distributions $p(s_1|\text{yield}=1, s_0)$ and $p(s_1|\text{yield}=0, s_0)$ to acquire actual probability values. FIG. 5 represents a probability value obtained by substituting the relative position of the vehicle M1 at the time point 1, and in the case of FIG. 5, $p(s_1|\text{yield}=1, s_0)>p(s_1|\text{yield}=0, s_0)$ is satisfied as an example. In this manner, the above-mentioned "comparison" between prediction parameters and actual parameters means acquiring probability values by substituting the actual parameters measured actually in the next step into the prediction distributions defined by the prediction parameters.

Next, the merging estimator 130 multiplies the probability value $p(s_1|\text{yield}=1, s_0)$ of another vehicle yielding to the host vehicle M in the current step by the previous probability value $P(\text{yield}=1|s_0)$ of another vehicle yielding to the host vehicle M, to thereby obtain $\alpha=p(s_1|\text{yield}=1, s_0)P(\text{yield}=1|s_0)$, and multiplies the probability value $p(s_1|\text{yield}=0, s_0)$ of another vehicle not yielding to the host vehicle M in the current step by the previous probability value $P(\text{yield}=0|s_0)$ of another vehicle not yielding to the host vehicle M, to thereby obtain $\beta=p(s_1|\text{yield}=0, s_0)P(\text{yield}=0|s_0)$. The values of $\alpha$ and $\beta$ mean the probability values in the current step considering the previous probability values. Next, the merging estimator 130 normalizes the values of $\alpha$ and $\beta$ as probability values to obtain probability values $P(\text{yield}=1|s_{0:1})=\alpha/(\alpha+\beta)$ and $P(\text{yield}=0|s_{0:1})=\beta/(\alpha+\beta)$ at the time point 1 considering the state $s_0$ of the time point 0. The merging estimator 130 uses the obtained $P(\text{yield}=1|s_{0:1})$ and $P(\text{yield}=0|s_{0:1})$ as previous values to estimate probability values at a time point 2.

To generalize processing of calculating probability values described above, the merging estimator 130 uses the state $s_{t-1}$ at the time point t−1 and the previous probability value $P(\text{yield}=1|s_{0:t-1})$ of another vehicle yielding to the host vehicle M and the previous probability value $P(\text{yield}=0|s_{0:t-1})$ of another vehicle not yielding to the host vehicle M, which consider the states $s_{0:t-1}$ from the time point 0 to the time point t−1, to calculate the prediction distribution $p(s_t|\text{yield}=1, s_{t-1})$ representing the relative speed and relative position that another vehicle would have at the time point t if another vehicle were to yield to the host vehicle M, and the prediction distribution $p(s_t|\text{yield}=0, s_{t-1})$ representing the relative speed and relative position that another vehicle would have at the time point t if another vehicle were to yield to the host vehicle M. Next, the merging estimator 130 calculates $\alpha=p(s_t|\text{yield}=1, s_{t-1})P(\text{yield}=1|s_{0:t-1})$ and $\beta=p(s_t|\text{yield}=1, s_{t-1})P(\text{yield}=1|s_{0:t-1})$, and normalizes the values of $\alpha$ and $\beta$ to calculate the probability value $P(\text{yield}=1|s_{0:t})=\alpha/(\alpha+\beta)$ of another vehicle yielding to the host vehicle M in the current step and the probability value $P(\text{yield}=0|s_{0:t})=\beta/(\alpha+\beta)$ of another vehicle not yielding to the host vehicle M in the current step. In this manner, it is possible to accurately estimate whether or not another vehicle is to yield to the host vehicle M in consideration of the time-series states of another vehicle.

The driving assister 140 determines whether or not probability value $P(\text{yield}=1|s_{0:t})$ of another vehicle yielding to the host vehicle M in the current step, which is updated by the merging estimator 130 in time series, is equal to or larger than a threshold value, and when it is determined that the probability value $P(\text{yield}=1|s_{0:t})$ in the current step is equal to or larger than the threshold value, displays, on the HMI 30, recommendation information for recommending that the host vehicle M changes lanes from the travel lane to the adjacent lane. Further, for example, the driving assister 140 determines whether or not the probability value $P(\text{yield}=0|s_{0:t})$ of another vehicle not yielding to the host vehicle M in the current step, which is updated by the merging estimator 130 in time series, is equal to or larger than a threshold value, and when it is determined that the probability value $P(\text{yield}=0|s_{0:t})$ in the current step is equal to or larger than the threshold value, displays, on the HMI 30, recommendation information for recommending that the host vehicle M does not change lanes from the travel lane to the adjacent lane.

Figure 6:
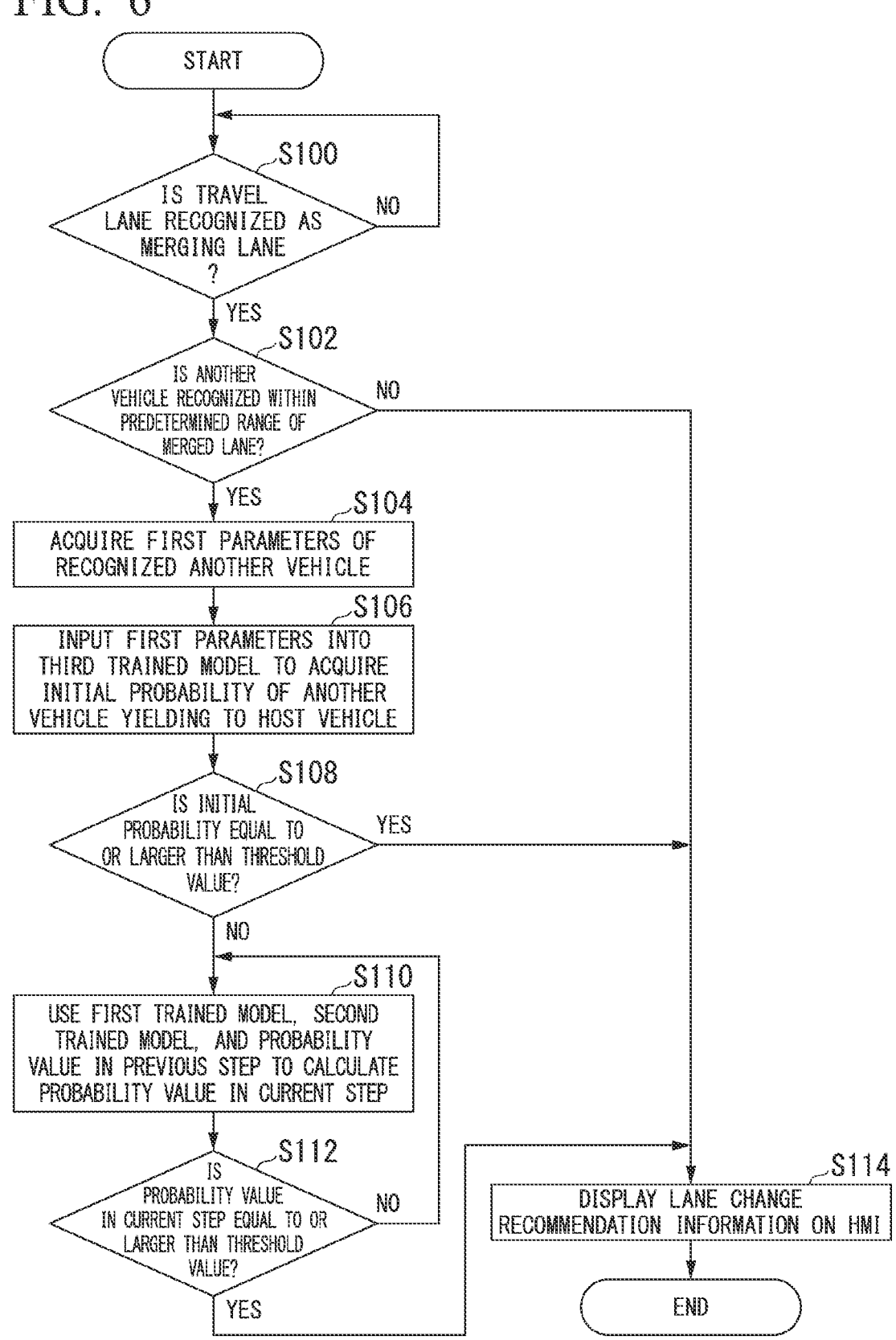
FIG. 6 is a flow chart illustrating an example of a flow of processing to be executed by the estimation device according to this embodiment.

Next, referring to FIG. 6, description is given of a flow of processing to be executed by the estimation device according to this embodiment. FIG. 6 is a flow chart illustrating an example of a flow of processing to be executed by the estimation device according to this embodiment. The processing of the flow chart illustrated in FIG. 6 is repeatedly executed while the host vehicle M is traveling.

First, the merging recognizer 110 uses, for example, road lane marking information recognized by the camera 10 to determine whether or not the travel lane of the host vehicle M is recognized as a merging lane (Step S100). When it is determined that the travel lane of the host vehicle M is not recognized as a merging lane, the merging recognizer 110 returns the processing to Step S100. On the other hand, when it is determined that the travel lane of the host vehicle M is recognized as a merging lane, the merging recognizer 110 determines whether or not another vehicle is recognized within a predetermined range of a merged lane (Step S102). When it is determined that another vehicle is not recognized within the predetermined range of the merged lane, the merging recognizer 110 advances the processing to Step S114 described later.

On the other hand, when it is determined that another vehicle is not recognized within the predetermined range of the merged lane, the parameter acquirer 120 acquires first parameters (that is, relative speed of another vehicle with respect to host vehicle M, relative position of another vehicle with respect to host vehicle M, and speed of host vehicle M) of recognized another vehicle (Step S104). Next, the merging estimator 130 inputs the acquired first parameters into the third trained model 156 to acquire an initial probability of another vehicle yielding to the host vehicle M (Step S106).

Next, the driving assister 140 determines whether or not the acquired initial probability is equal to or larger than a threshold value (Step S108). When it is determined that the acquired initial probability is equal to or larger than the threshold value, the driving assister 140 advances the processing to Step S114. On the other hand, when it is determined that the acquired initial probability is smaller than the threshold value, the merging estimator 130 uses the first trained model 152, the second trained model 154, and the probability value (initial probability in the case of initial step) in the previous step to calculate the probability value of another vehicle yielding to the host vehicle M in the current step (Step S110).

Next, the driving assister 140 determines whether or not the calculated probability value in the current step is equal to or larger than the threshold value (Step S112). When it is determined that the calculated probability value in the current step is equal to or larger than the threshold value, the driving assister 140 displays, on the HMI 30, recommendation information for recommending that the host vehicle M changes lanes from the travel lane to the adjacent lane (Step S114). On the other hand, when it is determined that the calculated probability value in the current step is smaller than the threshold value, the merging estimator 130 sets the calculated probability value in the current step as the probability value in the previous step to execute the processing of Step S110 again. The processing of this flow chart is finished in this manner.

In the embodiment described above, the driving assister 140 assists in driving of the host vehicle M based on the probability values estimated in time series by the merging estimator 130. However, the present invention is not limited to such a configuration, and the present invention can be applied to automatic driving of the host vehicle M. For example, the driving assistance device 100 may include a travel control unit instead of the driving as sister 140, and the travel control unit may perform steering control such that the host vehicle M changes lanes when the estimated probability value is equal to or larger than the threshold value, for example.

Further, in the embodiment described above, it is estimated as a predetermined action whether or not another vehicle is to yield to the host vehicle M at the time of merging by the host vehicle M. However, the present invention is not limited to such a configuration, and the present invention can be applied to control other than merging. For example, the present invention can be applied to estimation of a predetermined action, which is whether or not an oncoming vehicle is to yield to the host vehicle M when the host vehicle M turns right or left at an intersection. In that case, the first trained model 152 is generated based on training data and correct data collected when an oncoming vehicle yielded to the host vehicle M, and the second trained model 154 is generated based on training data and correct data collected when an oncoming vehicle did not yield to the host vehicle M. Further, for example, the present invention can be applied to estimation of a predetermined action, which is whether or not an oncoming vehicle is to yield a parking space to the host vehicle M when the host vehicle M stops at a parking lot. In that case, the first trained model 152 is generated based on training data and correct data collected when an oncoming vehicle yielded a parking space to the host vehicle M, and the second trained model 154 is generated based on training data and correct data collected when an oncoming vehicle did not yield a parking space to the host vehicle M.

Further, in the embodiment described above, the estimation device is mounted on the host vehicle M. However, the present invention is not limited to such a configuration, and for example, the feature of the estimation device may be mounted on an infrastructure camera installed in a merging area to monitor vehicles. In that case, in the flow chart of FIG. 6, Step S100 is omitted, and in the processing of Step S102, when the distance between a vehicle traveling on a merging lane and another vehicle traveling on a merged lane falls within a predetermined range, the processing of from Step S104 to Step S112 is executed. In Step S112, when it is determined that the probability of another vehicle yielding to the host vehicle M is equal to or larger than the threshold value, the infrastructure camera may transmit information for recommending lane change through wireless communication to the vehicle traveling on the merging lane.

According to this embodiment, it is estimated whether or not another vehicle is to yield to a host vehicle by comparing actual parameters of another vehicle with prediction distributions of the state of another vehicle, which are output from a first trained model generated based on training data collected when another vehicle yielded to a host vehicle and a second trained model generated based on training data collected when another vehicle did not yield to a host vehicle. As a result, it is possible to accurately estimate behavior of a second mobile object at the time of merging by a mobile object by effectively utilizing data of the second mobile object.

The embodiment described above can be represented in the following manner.

An estimation device for estimating an action of a second mobile object for a mobile object, including a storage medium storing computer-readable commands, and a processor connected to the storage medium, the processor being configured to execute the computer-readable commands to: acquire prediction parameters, which are distribution information on second parameters, by inputting actual parameters, which are first parameters, into: a first trained model, which is trained to output distribution information on second parameters in response to input of first parameters by using training data and correct data, the training data including time-series first parameters representing a relationship between the mobile object and the second mobile object in a first scene in which the second mobile object has taken a predetermined action, the correct data including second parameters representing states of the second mobile object in the first scene; and a second trained model, which is trained to output distribution information on second parameters in response to input of first parameters by using training data and correct data, the training data including the time-series first parameters in a second scene in which the second mobile object has not taken the predetermined action, the correct data including the second parameters in the second scene; and estimate whether or not the second mobile object is to take the predetermined action by comparing the prediction parameters with the actual parameters at a subject time of the prediction parameters.

This concludes the description of the embodiment for carrying out the present invention. The present invention is not limited to the embodiment in any manner, and various kinds of modifications and replacements can be made within a range that does not depart from the gist of the present invention.

What is claimed is:

1. An estimation device for estimating an action of a second mobile object for a mobile object, comprising a storage medium storing computer-readable commands, and a processor connected to the storage medium, the processor being configured to execute the computer-readable commands to:

acquire prediction parameters, which are distribution information on second parameters, by inputting actual parameters, which are first parameters, into:

a first trained model, which is trained to output distribution information on second parameters in response to input of first parameters by using training data and correct data, the training data including time-series first parameters representing a relationship between the mobile object and the second mobile object in a first scene in which the second mobile object has taken a predetermined action, the correct data including second parameters representing states of the second mobile object in the first scene, and a second trained model, which is trained to output distribution information on second parameters in response to input of first parameters by using training data and correct data, the training data including the time-series first parameters in a second scene in which the second mobile object has not taken the predetermined action, the correct data including the second parameters in the second scene;

estimate that the second mobile object is to take the predetermined action by comparing the prediction parameters with the actual parameters at a subject time of the prediction parameters, resulting in an action estimation; and based on the action estimation, controlling the mobile object such that the mobile object operates in accordance with the second mobile object taking the predetermined action.

2. The estimation device according to claim 1, wherein the first parameters include at least a relative speed of the second mobile object with respect to the mobile object, a relative position of the second mobile object with respect to the mobile object, and a speed of the mobile object.

3. The estimation device according to claim 1, wherein the distribution information on second parameters output from the first trained model comprises first distribution information on a relative speed and relative position of the second mobile object with respect to the mobile object predicted if the second mobile object has taken the predetermined action, and the distribution information on second parameters output from the second trained model comprises second distribution information on a relative speed and relative position of the second mobile object with respect to the mobile object predicted if the second mobile object has not taken the predetermined action.

4. The estimation device according to claim 3, wherein the processor performs repeated estimation of whether or not the second mobile object is to take the predetermined action by a probability value, and wherein the processor uses the probability value at a previous time of estimation, the first distribution information at a current time of estimation, and the second distribution information at the current time of estimation to estimate the probability value at the current time.

5. The estimation device according to claim 4, wherein the processor estimates the probability value at an initial time of the repeated estimation by using a third trained model that is trained to output whether or not the second mobile object is to take the predetermined action as a probability value in response to input of a parameter representing a relationship between the mobile object and the second mobile object.

6. The estimation device according to claim 4, wherein the processor assists in driving of the mobile object based on the probability value.

7. The estimation device according to claim 1, wherein the predetermined action comprises an action indicating that when the mobile object changes lanes from a travel lane to an adjacent lane, the second mobile object traveling on the adjacent lane allows the mobile object to merge into the adjacent lane.

8. An estimation method for estimating an action of a second mobile object for a mobile object, which is to be executed by a computer, the estimation method comprising:

acquiring prediction parameters, which are distribution information on second parameters, by inputting actual parameters, which are first parameters, into:

a first trained model, which is trained to output distribution information on second parameters in response to input of first parameters by using training data and correct data, the training data including time-series first parameters representing a relationship between the mobile object and the second mobile object in a first scene in which the second mobile object has taken a predetermined action, the correct data including second parameters representing states of the second mobile object in the first scene, and a second trained model, which is trained to output distribution information on second parameters in response to input of first parameters by using training data and correct data, the training data including the time-series first parameters in a second scene in which the second mobile object has not taken the predetermined action, the correct data including the second parameters in the second scene;

estimating that the second mobile object is to take the predetermined action by comparing the prediction parameters with the actual parameters at a subject time of the prediction parameters, resulting in an action estimation; and based on the action estimation, controlling the mobile object such that the mobile object operates in accordance with the second mobile object taking the predetermined action.

9. A program for estimating an action of a second mobile object for a mobile object, which is to be executed by a computer, the program causing the computer to:

acquire prediction parameters, which are distribution information on second parameters, by inputting actual parameters, which are first parameters, into:

a first trained model, which is trained to output distribution information on second parameters in response to input of first parameters by using training data and correct data, the training data including time-series first parameters representing a relationship between the mobile object and the second mobile object in a first scene in which the second mobile object has taken a predetermined action, the correct data including second parameters representing states of the second mobile object in the first scene, and a second trained model, which is trained to output distribution information on second parameters in response to input of first parameters by using training data and correct data, the training data including the time-series first parameters in a second scene in which the second mobile object has not taken the predetermined action, the correct data including the second parameters in the second scene;

estimate that the second mobile object is to take the predetermined action by comparing the prediction parameters with the actual parameters at a subject time of the prediction parameters, resulting in an action estimation; and based on the action estimation, controlling the mobile object such that the mobile object operates in accordance with the second mobile object taking the predetermined action.

* * * * *